United States Patent
Sun et al.

(10) Patent No.: US 6,651,601 B2
(45) Date of Patent: Nov. 25, 2003

(54) CONTROL STRATEGY FOR IMPROVING COLD CRANKING, STARTING, AND WARM-UP OF AN ENGINE HAVING A VARIABLE VALVE ACTUATION MECHANISM

(75) Inventors: Jinhui Sun, Bloomington, IL (US); Xinqun Gui, Lisle, IL (US); Xiaoyan Lei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 93 days.

(21) Appl. No.: 10/115,193

(22) Filed: Apr. 2, 2002

(65) Prior Publication Data

US 2003/0183185 A1 Oct. 2, 2003

(51) Int. Cl.$^7$ .............................................. F02N 17/00
(52) U.S. Cl. .............................. 123/179.16; 123/182.1; 123/179.13
(58) Field of Search ..................... 123/179.1, 179.13, 123/179.14, 179.15, 179.16, 179.22, 182.1

(56) References Cited

U.S. PATENT DOCUMENTS

| | | | |
|---|---|---|---|
| 4,216,175 A | * 8/1980 | Schauer | 261/139.5 |
| 5,007,390 A | * 4/1991 | Tanaka et al. | 123/179.15 |
| 5,474,047 A | * 12/1995 | Cochard et al. | 123/491 |
| 5,718,204 A | * 2/1998 | Sugii | 123/438 |

* cited by examiner

Primary Examiner—John Kwon
(74) Attorney, Agent, or Firm—Dennis Kelly Sullivan; Susan L. Lukasik; Jeffrey P. Calfa

(57) ABSTRACT

A control (30) embodies an operating strategy (50) to facilitate engine cranking and starting via control of timing of cylinder intake (18) and exhaust (24) valve opening using a variable valve actuation mechanism (26). Prior to fueling any cylinder (16), the engine (10) is cranked while the variable valve actuation mechanism causes pistons (32) to operate at an initial effective compression ratio for initial cranking that is less than an effective compression ratio for running when the engine is eventually fueled and runs under its own power. Thereafter, and still before fueling, they are caused to operate at an increased effective compression ratio, and still thereafter, a portion of their charges are drawn from the exhaust system (22). As the engine warms up, valve timing is adjusted.

30 Claims, 13 Drawing Sheets

CONTROL STRATEGY FOR IMPROVING COLD CRANKING, STARTING, AND WARM-UP OF AN ENGINE HAVING A VARIABLE VALVE ACTUATION MECHANISM

FIELD OF THE INVENTION

This invention relates generally to internal combustion engines that propel motor vehicles and are equipped with variable valve actuation. In particular the invention relates to a control strategy for cylinder valve actuation that facilitates cold cranking, starting, and warm-up of such an engine, especially a diesel engine.

BACKGROUND AND SUMMARY OF THE INVENTION

Starting of a diesel engine requires significant effort because of the high compression ratio that is inherent in such an engine. Cold temperatures compound the effort. In an automotive vehicle having a diesel engine as the prime mover, the use of cold-start aids such as glow plugs and intake air heaters may be necessary to start the engine. The electric starter motor for turning the engine over must be sufficiently powerful both to compress charges in the engine cylinders and to overcome the relatively substantial resistance torque that the kinematic mechanism of the engine imposes when the engine is cold.

The creation of an engine and an operating strategy that can facilitate engine cranking and starting, especially when the engine is cold, is therefore seen to be a desirable objective. The present invention seeks that objective through the use of a variable actuation mechanism for engine cylinder valves and of an engine control system embodying solid-state electronics that are processor-based. The processor can process certain data inputs to develop data outputs defining valve opening and closing times that are most appropriate to the inventive strategy. The data outputs are converted into electric signals that are delivered via electric circuits to actuators of the variable valve actuation mechanism.

Because certain principles of the present invention include changing the time in the engine operating cycle when the intake and exhaust valves for the engine cylinders open and close, the variable valve actuation mechanism of the engine must be effective on each such cylinder valve. An example of such a mechanism comprises an electric actuator for opening and closing each corresponding cylinder valve in accordance with the electric signal applied to the actuator. This type of engine is sometimes referred to as a camless engine.

A primary aspect of the present invention relates to a novel strategy for controlling the timing of the opening and closing of both cylinder intake and cylinder exhaust valves in an internal combustion engine that has a variable valve actuation mechanism for operating those valves, especially controlling the valve timing when the engine is being cranked and started while cold.

One aspect of the present invention relates to a novel strategy for an internal combustion engine, especially a compression ignition, or diesel, engine that has a variable valve actuation mechanism for varying the timing of cylinder intake and exhaust valves. The disclosed strategy is implemented via an electronic engine control that processes input data representing values of certain parameters that are relevant to engine operation, including parameters relevant to control of the timing of opening and closing of the cylinder valves in accordance with principles of the invention. Data for operating the variable valve actuation mechanism is processed according to a software algorithm that is executed by the control to develop output data representing desired timing for opening and closing the cylinder valves. The data is converted to signals suitable for operating electric actuators of the variable value actuation mechanism to open and close the cylinder valves.

One general aspect of the claimed invention relates to a method of cranking and starting a multi-cylinder internal combustion engine at an engine temperature that is substantially below a range of engine operating temperatures within which engine operation will eventually stabilize after the engine has been running for an amount of time sufficient to bring its temperature within that temperature range. The engine has a kinematic mechanism, including pistons that reciprocate within the cylinders, through which energy of combustion occurring within the cylinders is converted to a torque output. A variable valve actuation mechanism varies the opening and closing times of intake and exhaust valves that control flow between the cylinders and the respective intake and exhaust systems.

The method comprises: a) cranking the engine while not fueling the cylinders and while operating the variable valve actuation mechanism to cause the pistons in at least some of the cylinders to operate at an initial effective compression ratio for initial cranking that is less than an effective compression ratio for running when the engine is eventually fueled and runs under its own power; b) then, while continuing not fueling the cylinders, operating the variable valve actuation mechanism to cause the pistons in those cylinders that are operating at the initial effective compression ratio to draw charge air through a respective intake valve and compress the drawn charges to an increased effective compression ratio that is greater than the initial effective compression ratio and to exhaust the compressed charges through a respective exhaust valve into the exhaust system; c) then operating the variable valve actuation mechanism to cause the pistons in those cylinders to continue operating at the increased effective compression ratio while commencing to draw a portion of their charges from the exhaust system through the respective exhaust valve; and d) then commencing the fueling of less than all of the cylinders while operating the variable valve actuation mechanism to operate the intake and exhaust valves of the cylinders being fueled to cause the engine to start running under its own power.

Another aspect relates to an engine embodying a control for performing the foregoing method.

Another general aspect of the claimed invention relates to a method of cranking a multi-cylinder internal combustion engine prior to fueling any cylinder. The method comprises: a) cranking the engine while operating the variable valve actuation mechanism to cause the pistons in at least some of the cylinders to operate at an initial effective compression ratio for initial cranking that is less than an effective compression ratio for running when the engine is eventually fueled and runs under its own power; b) then operating the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system; and c) then operating the variable valve actuation mechanism to cause the pistons in those cylinders to continue operating at the increased effective compression ratio while commencing to draw a portion of their charges from the exhaust system through the respective exhaust valve.

Another aspect relates to an engine embodying a control for performing the foregoing method.

Still another general aspect of the claimed invention relates to a method of cranking and starting a multi-cylinder internal combustion engine at a starting engine temperature and then running the engine to a running engine temperature that is substantially greater than the starting engine temperature. The method comprises: a) cranking the engine while the cylinders are not being fueled and while operating the variable valve actuation mechanism to cause the pistons in at least some of the cylinders to operate at an initial effective compression ratio for initial cranking that is less than an effective compression ratio for running when the engine is eventually fueled and runs under its own power; b) then, while the cylinders continue not to be fueled, operating the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system; c) then operating the variable valve actuation mechanism to cause the pistons in those cylinders to continue operating at the increased effective compression ratio while commencing to draw a portion of their charges from the exhaust system through the respective exhaust valve; d) then commencing the fueling of at least some of the cylinders and operating the variable valve actuation mechanism to operate the intake and exhaust valves of the cylinders being fueled to start the engine running under its own power; and e) operating the variable valve actuation mechanism to advance the timing of opening of the exhaust valves from what that timing will become once the engine has attained running temperature and to change that timing as a function of engine temperature as the engine temperature approaches running temperature.

Another aspect relates to an engine embodying a control for performing the foregoing method.

Yet another general aspect relates to a method of starting a multi-cylinder internal combustion engine at a starting engine temperature and then running the engine to a running engine temperature that is substantially greater than the starting engine temperature. The method comprises: a) before fueling the cylinders, operating the variable valve actuation mechanism to cause the pistons in at least some of the cylinders to commence drawing charge air through a respective intake valve, compress the charge air, and exhaust the compressed charge air through a respective exhaust valve into the exhaust system; b) then operating the variable valve actuation mechanism to cause the pistons in those cylinders to commence drawing a portion of their charges from the exhaust system through the respective exhaust valve; c) then commencing the fueling of those cylinders and operating the variable valve actuation mechanism to operate the intake and exhaust valves of those cylinders to start the engine running under its own power; and d) then operating the variable valve actuation mechanism to decrease the amount of advance in the opening time of the exhaust valves of those cylinders as engine operating temperature increases.

Another aspect relates to an engine embodying a control for performing the foregoing method.

Still another general aspect of the invention relates to a method of starting a multi-cylinder internal combustion engine at a starting engine temperature and then running the engine to a running engine temperature that is substantially greater than the starting engine temperature. The method comprises, before fueling cylinders of the engine, operating a variable valve actuation mechanism to cause pistons in at least some of the cylinders to commence drawing charge air through a respective intake valve, compress the charge air, and exhaust the compressed charge air through a respective exhaust valve into the exhaust system. Then the variable valve actuation mechanism operates to cause the pistons in those cylinders to commence drawing a portion of their charges from the exhaust system through the respective exhaust valve, and when fueling is subsequently commenced, operates the intake and exhaust valves of those cylinders to start the engine running under its own power. The variable valve actuation mechanism then operates to decrease the amount of advance in the opening time of the exhaust valves of those cylinders as engine operating temperature increases.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
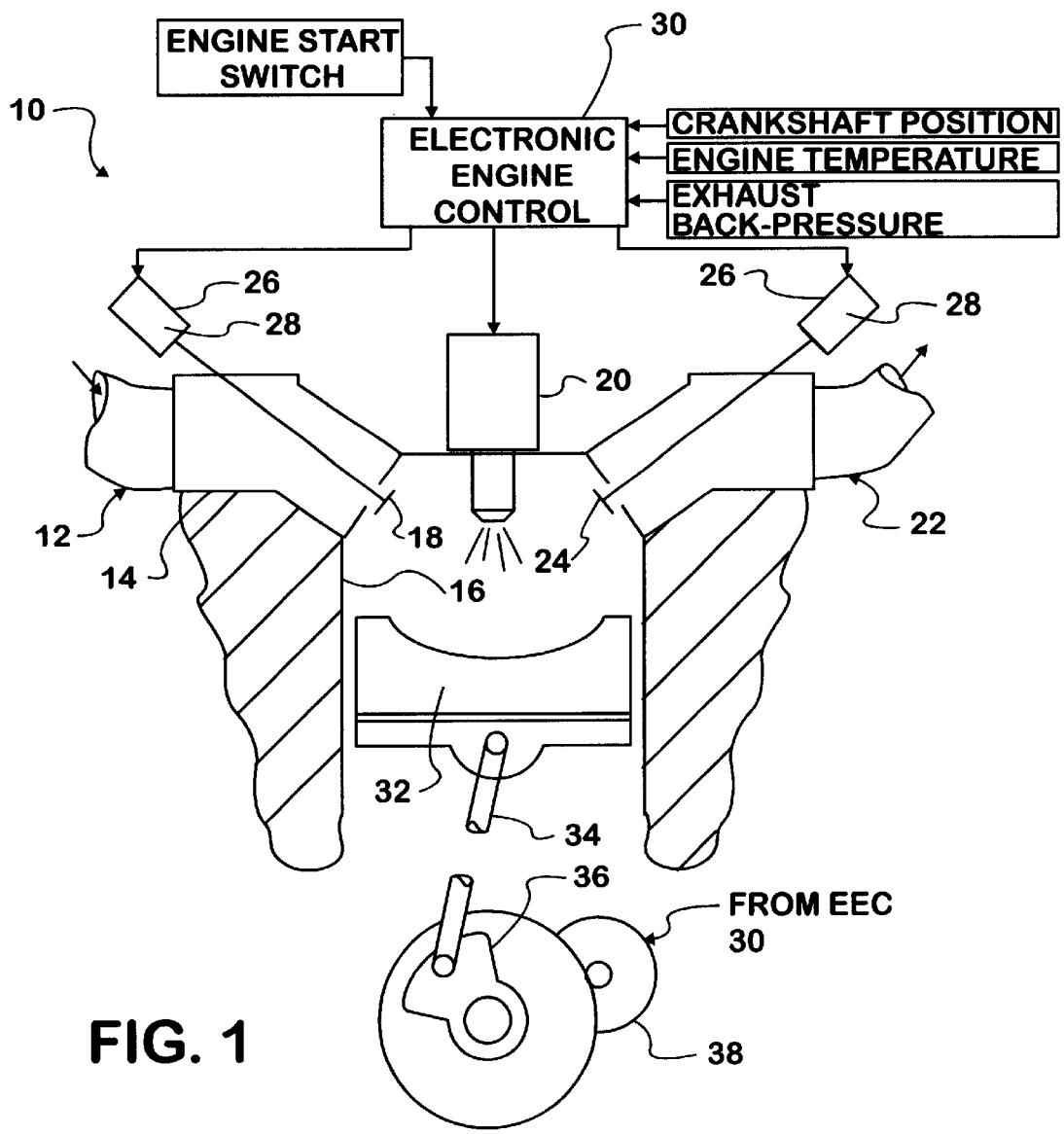
FIG. 1 is a general schematic diagram of an exemplary compression ignition engine, in accordance with principles of the present invention.

FIG. 1 illustrates a multi-cylinder internal combustion engine 10 that powers a motor vehicle. An example of such a vehicle is a truck having a chassis containing a powertrain in which engine 10 is a fuel-injected diesel engine operatively coupled through a drivetrain to driven wheels for propelling the vehicle.

Engine 10 comprises an intake system 12, including an intake manifold 14, through which charge air is delivered to cylinders 16 of engine 10. Charge air enters each engine cylinder 16 from manifold 14 via a corresponding intake valve 18. Individual fuel injectors 20 inject diesel fuel into individual engine cylinders in properly timed relation to engine operation. Engine 10 also comprises an exhaust system 22 for conveyance of exhaust gases created by combustion within the engine cylinders from the engine. Exhaust gases pass out of each cylinder via a respective exhaust valve 24 into exhaust system 22.

Engine 10 comprises a variable valve actuation mechanism 26 that allows the time of intake valve opening (IVO) and closing (IVC) and the time of exhaust valve opening (EVO) and closing (EVC) to be varied. Such an engine is sometimes referred to as may be a camless engine, meaning one where each of the normally closed intake and exhaust valves is opened at a desired time in the engine operating cycle by applying an electric signal to a respective electric actuator 28. Termination of the signal results in re-closing of the associated valve.

An electronic engine control 30 that possesses digital processing capability is associated with engine 10. Control 30 may comprise one or more processors that process data from various input data sources in accordance with one or more programmed algorithms to develop certain data for performance of various functions associated with operation of engine 10. Certain data processed by control 30 represents variables and may originate at external sources (input variables) and/or be generated internally of control 30 (local variables). Other data may be programmed into and stored in control 30. From input and/or programmed data, control 30 develops data for operating the intake and exhaust valve actuators 28 and for operating fuel injectors 20.

Engine control 30 contains a software program that implements the one or more algorithms used for control of engine operation, including control of engine cranking, timing of valves 18 and 24 via mechanism 26, and fueling of cylinders 16 via fuel injectors 20. The present invention relates to aspects of control when the engine is started and begins warming up. An example of an algorithm for implementing the invention is presented in FIG. 2 where it is designated by the reference numeral 50.

Engine 10 further comprises a kinematic mechanism, including pistons 32 that reciprocate within cylinders 16 and are coupled by rods 34 to a crankshaft 36. When running, the engine executes the usual 720 degree engine cycle comprising intake, compression, power, and exhaust strokes, each of the four strokes being of 180 degrees duration. Intake and power strokes occur on downstrokes of pistons 32 while compression and exhaust strokes occur on upstrokes. As injected fuel is combusted in cylinders 16 during each engine cycle, the energy of combustion is converted to crankshaft output torque to run the engine and operate the motor vehicle. Engine 10 also comprises are an electric cranking, or starter, motor 38 for cranking crankshaft 36 at engine starting.

When algorithm 50 is executed, it performs a series of steps that result in the performance of certain functions involving engine 10. A first step 52 comprises cranking engine 10 via cranking motor 38 when a driver of the vehicle operates a start switch. Once cranking begins, at least some of cylinders 16, and preferably all cylinders, assume conditions that cause the respective piston 32 in each of those cylinders to operate at an initial effective compression ratio for initial cranking that is less than an effective compression ratio for running that occurs later when engine is eventually fueled and runs under its own power. This minimizes the cranking load that is imposed on motor 38 at starting of the cranking motor. In accordance with certain principles of the invention, no fuel is injected into any cylinder 16 during initial cranking.

Figure 2:
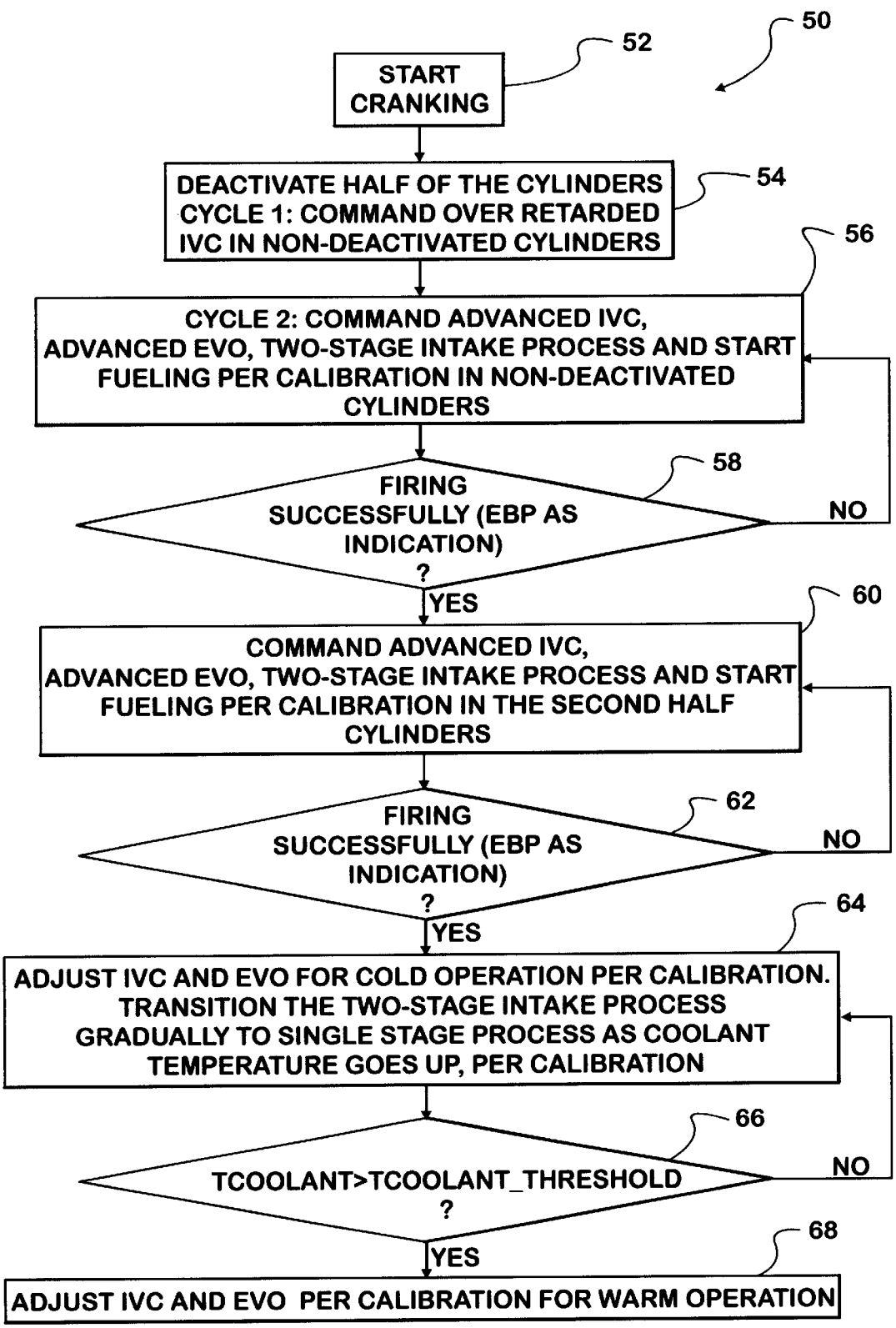
FIG. 2 is an exemplary flow diagram of an algorithm used in practicing the invention.

A second step 54 in FIG. 2 illustrates one way of minimizing the cranking load that is imposed on starter motor 38 when first energized. Step 54 comprises operating variable valve actuation mechanism 26 to operate the intake and exhaust valves such that some, but not all, of cylinders 16 are de-activated. In the example being described here, one-half of the cylinders are de-activated, meaning four cylinders in the case of an eight-cylinder engine. De-activation of a cylinder means that its piston performs essentially no work of compression as cranking proceeds. During step 54 control 30 also commands a cycle, Cycle 1 in FIG. 2, where over-retarded intake valve closing occurs in the non-de-activated cylinders so that like the de-activated cylinders, the non-de-activated ones also operate at an initial effective compression ratio for initial cranking that is less than the effective compression ratio for running. Cycle 1 may continue for one or more engine cycles of each non-de-activated cylinder as cranking continues.

Next, control 30 commands a step 56 that comprises a cycle, Cycle 2 in FIG. 2, that initiates accelerated engine heating. During a first portion of Cycle 2, control 30 commands variable valve actuation mechanism 26 to operate the intake and exhaust valves of each of the non-de-activated cylinders at respective timing that causes the respective piston 32 to draw charge air from intake system 12 through a respective intake valve 18 during an intake stroke and compress the drawn charge during an immediately successive compression stroke to an increased effective compression ratio that is greater than the initial effective compression ratio and to exhaust the compressed charges through a respective exhaust valve 24 into exhaust system 22 during an exhaust stroke that occurs immediately after the downstroke that follows the compression stroke. This accelerated engine heating is accomplished by operating variable valve actuation mechanism 26 to advance the closing of the intake valves of the non-de-activated cylinders and to advance the opening of the exhaust valves of those cylinders.

Figure 3:
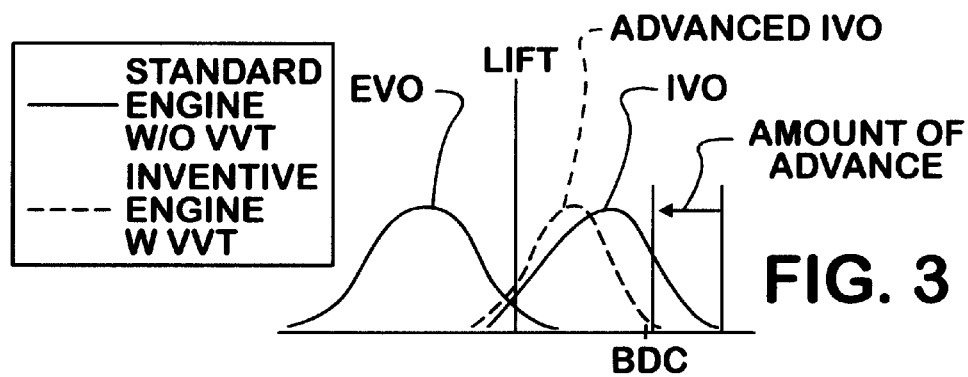
FIGS. 3–7 are timing plots of valve operation that are useful in understanding the invention.

Advanced closing of the intake valves is graphically portrayed by the timing profile in FIG. 3 which shows a representative intake valve closed substantially at bottom dead center (BDC) before the beginning of a compression upstroke. The closing of the intake valves is advanced to an extent that may seek to maximize the mass of air that will subsequently be compressed, and thereby maximize the increased effective compression ratio, while avoiding reverse flow in doing so. The work of compression imparts thermal energy to the air as the air is compressed, thereby heating it. Both intake and exhaust valves remain closed as the piston downstrokes after having completed the compression upstroke.

Figure 4:
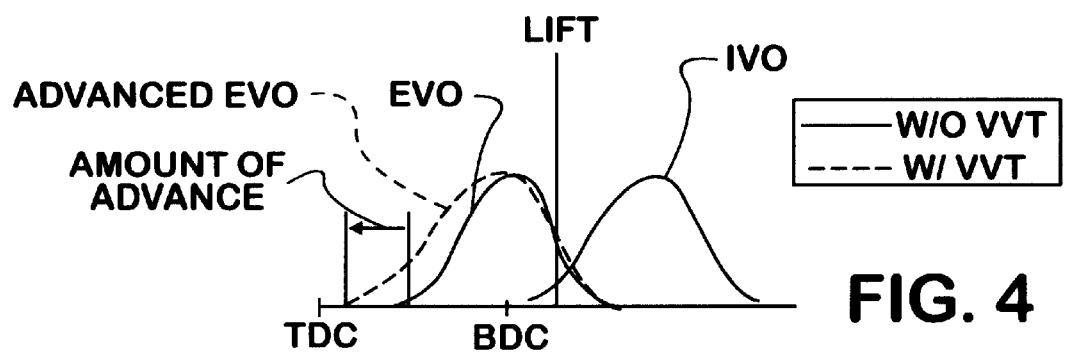

Advancing of exhaust valve opening is portrayed by the timing profile of FIG. 4. Because the maximum cylinder temperature is achieved when fresh air is compressed to TDC, gas that exits a cylinder through an exhaust port to the exhaust manifold will be hotter if the exhaust valve opens early during the expansion stroke. When the exhaust valve opens again during an early portion of the intake stroke, some of this hotter gas in the exhaust manifold will be drawn back into the cylinder. This is believed beneficial to increased heat transfer to the cylinder wall, or liner, and hence increasing engine temperature.

Figure 5:
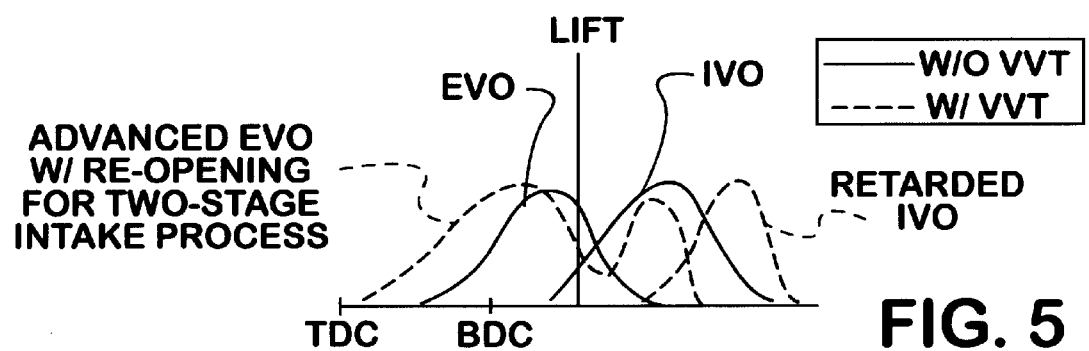

Additional heating is achieved during a second portion of Cycle 2 when control 30 commands variable valve actuation mechanism 26 to operate the valves of the non-de-activated cylinders in a manner that creates a two-stage intake process for each of those cylinders, rather than the single-stage process described above where charge air enters essentially only through a respective intake valve. The additional stage of the intake process occurs before charge air is drawn through the respective intake valve. Before opening the respective intake valve during the intake downstroke, the respective exhaust valve that was closing, either fully or at least partially, as the immediately preceding exhaust upstroke was concluding, is commanded to re-open and then re-close, as portrayed in FIG. 5. This allows the intake stroke to initially draw some air from the exhaust system back into the cylinder, amounting to internal recirculation of air that had been previously heated by compression in the cylinders. Because that recirculated air is warmer than the fresh charge air entering from intake system 12, additional heat can transfer to the engine through the cylinder wall, or liner, rather than being lost through exhaust system 22. As the re-opened exhaust valve is re-closing, the respective intake valve begins to open. It should be noticed that the timing of opening is retarded from what it had been during the first portion of Cycle 2 when only fresh air formed the charge. The opening of the exhaust valve allows fresh charge air from intake system 12 to be drawn into the cylinder as the intake stroke proceeds and represents the other stage of two-stage intake process. Each of the two portions of Cycle 2 may last for one or more engine cycles of each non-de-activated cylinder as cranking continues. At some point in Cycle 2, fueling of the non-de-activated cylinders begins.

As, shown by step 58 in FIG. 2, control 30 monitors engine 10 to detect the advent of combustion in the cylinders being fueled. Combustion may be detected in any suitable way, such as by sensing an increase in exhaust back-pressure via an associated sensor. Once combustion has been detected in all non-de-activated cylinders, the de-activated cylinders are activated in sequence in accordance with a step 60. Control 30 operates the intake and exhaust valves of each such cylinder in the manner of Cycle 2 as described above, and proceeds to fuel each cylinder in sequence. In this way pistons 32 of these latter cylinders begin powering the engine sequentially such that each succeeding one commences powering the engine only after a preceding one that has begun to power the engine has executed at least one engine cycle. Control 30 monitors the successful firing of each additional cylinder by exhaust back-pressure sensing, as represented by step 62.

With engine 10 now running on all cylinders, engine operating temperature is used as a controlling parameter to adjust intake and exhaust valve timing. Engine operating temperature may be monitored by a coolant temperature sensor. The amount and/or rate of adjustment depend on the starting temperature of the engine, and the temperature range at which engine operation will eventually stabilize. With the engine now combusting fuel, what had previously been internal recirculation only of previously compressed air, is now internal exhaust gas recirculation. The amount of internally recirculated exhaust gas is therefore adjusted in accordance with a programmed schedule previously derived from calibrating the particular engine model in the particular vehicle for achieving desired engine performance with respect to various considerations that may include fuel economy, engine torque, and tailpipe emissions. In general, control 30 will reduce the amount of internal recirculation as engine operating temperature increases, ultimately to eliminating the internal recirculation at some temperature, as indicated by step 64 in FIG. 2 which describes the two-stage intake process transitioning to single stage. Once the engine temperature has stabilized within a range of running operating temperatures as detected by step 66, control 30 causes mechanism 26 to time the intake and exhaust valves for warm engine operation, according to warm calibration parameters, as disclosed by step 68.

Figure 6:
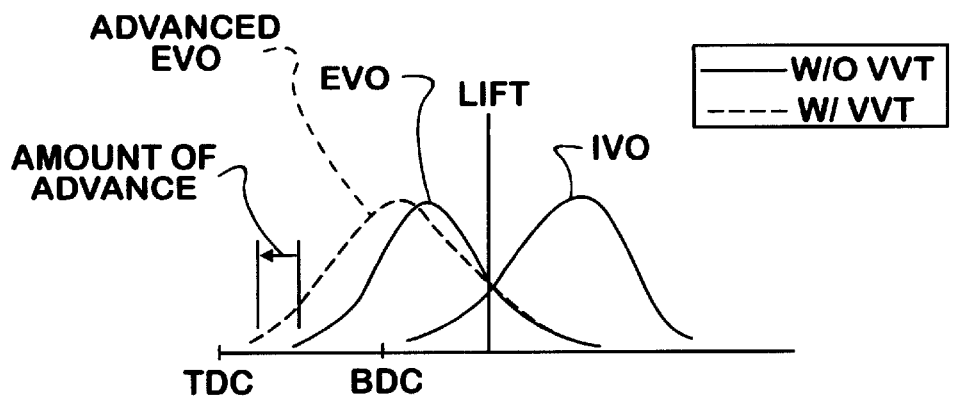
Figure 7:
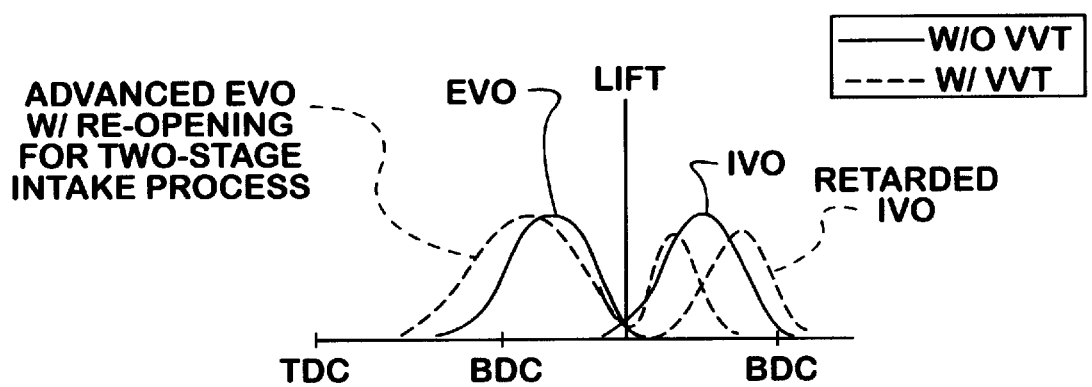

Once the engine has commenced running on all cylinders, engine operating temperature is a significant parameter in controlling the timing of intake and exhaust valve operation via mechanism 26. If the engine is cold at starting, it will have to run for some amount of time to reach the range of operating temperatures at which its operating temperature will stabilize. Step 64 of FIG. 2 represents the engine warm-up process. During that time, exhaust valve opening, as represented by FIG. 6, is less advanced than it was at cranking and starting, as represented by FIG. 4. FIG. 7 shows that the duration of exhaust valve opening during the two-stage intake process is smaller than it was before the cylinder began running. This takes into account the fact that combustion is now occurring. The intake valve opening may not have to be retarded from the exhaust valve reopening if the hydraulics of the variable valve actuation mechanism is capable of opening both intake and exhaust valves substantially simultaneously.

As confirmation of the inventive principles, a simulation study was designed and conducted. The strategies of: 1) using the two-stage intake process; and 2) using the two-stage intake process in combination with advancing the timing of exhaust valve opening; Evaluation of the results demonstrated that strategy 2), the two-stage intake process in combination with advancing the timing of exhaust valve opening was a more effective method than strategy 1) to improve engine cold start performance. Strategy 2) showed that:

The cylinder temperature at intake valve closing (IVC) was dramatically increased. This increase can significantly enhance fuel vaporization and improve engine cold start performance.

The average heat transfer to the cylinder wall was also raised, which can accelerate engine coolant and cylinder wall warm-up.

It may however be preferable to apply strategy 2) only to some of the cylinders for an I-6 or V-8 engine, because cylinder trapped air mass was reduced and motoring work was increased due to reduced expansion work.

Strategy 1): Two-stage Intake Process

Figure 8:
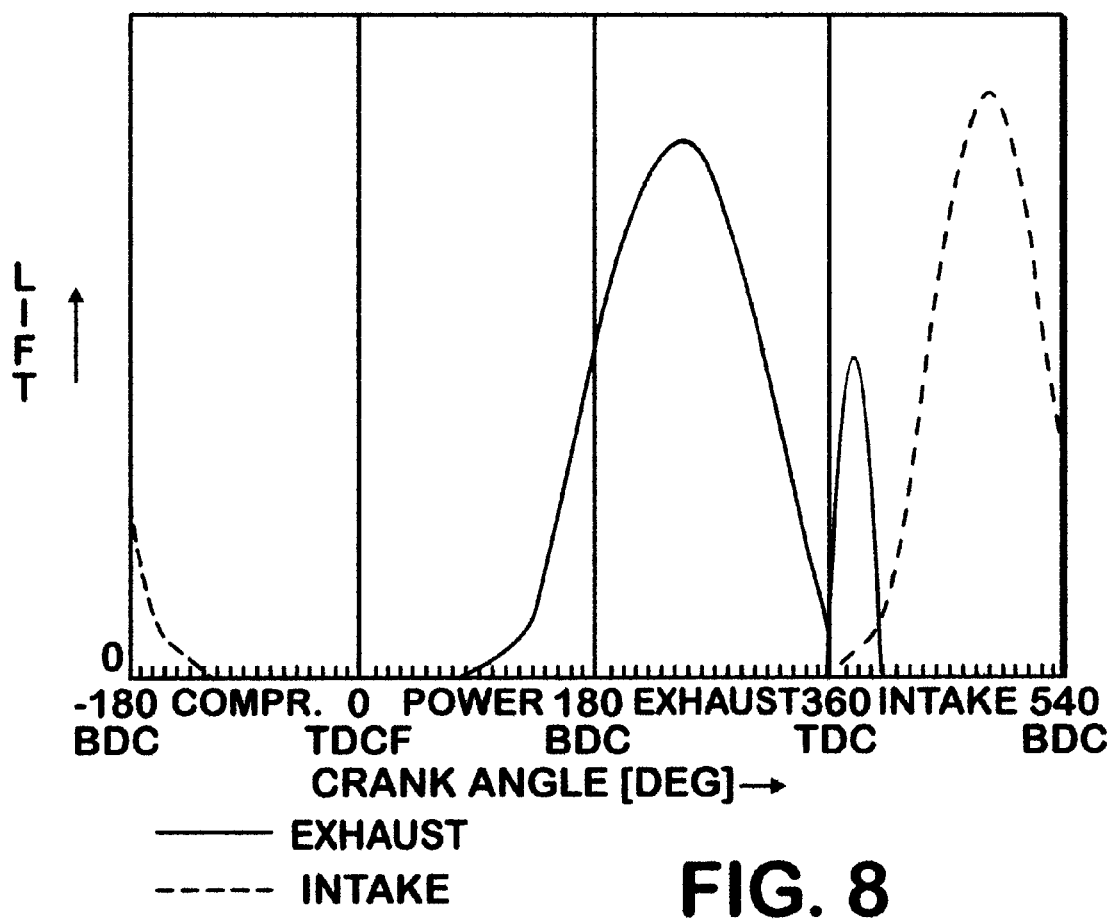
FIGS. 8–10 are timing plots of valve operation in a simulation involving certain principles of the invention.
Figure 9:
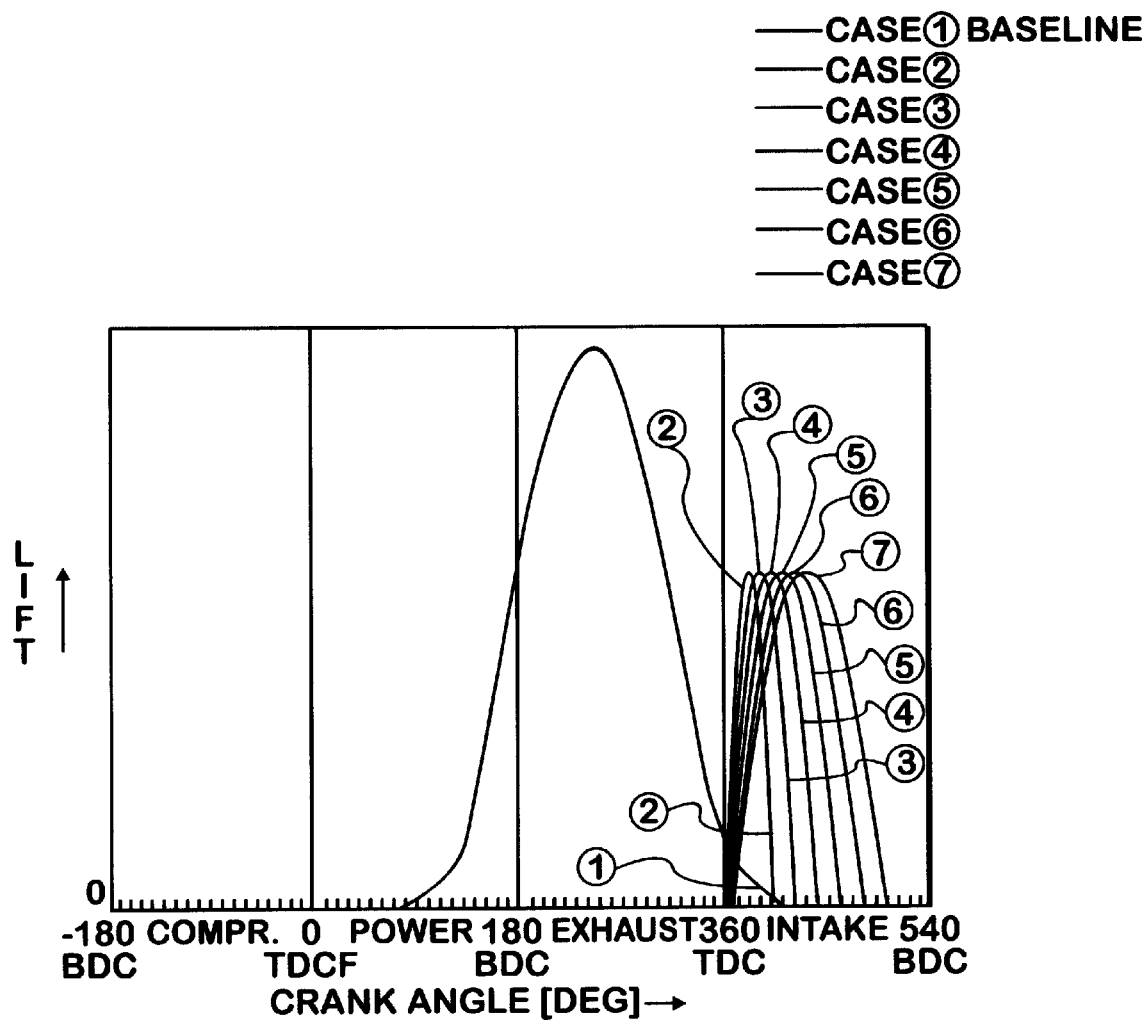
Figure 10:
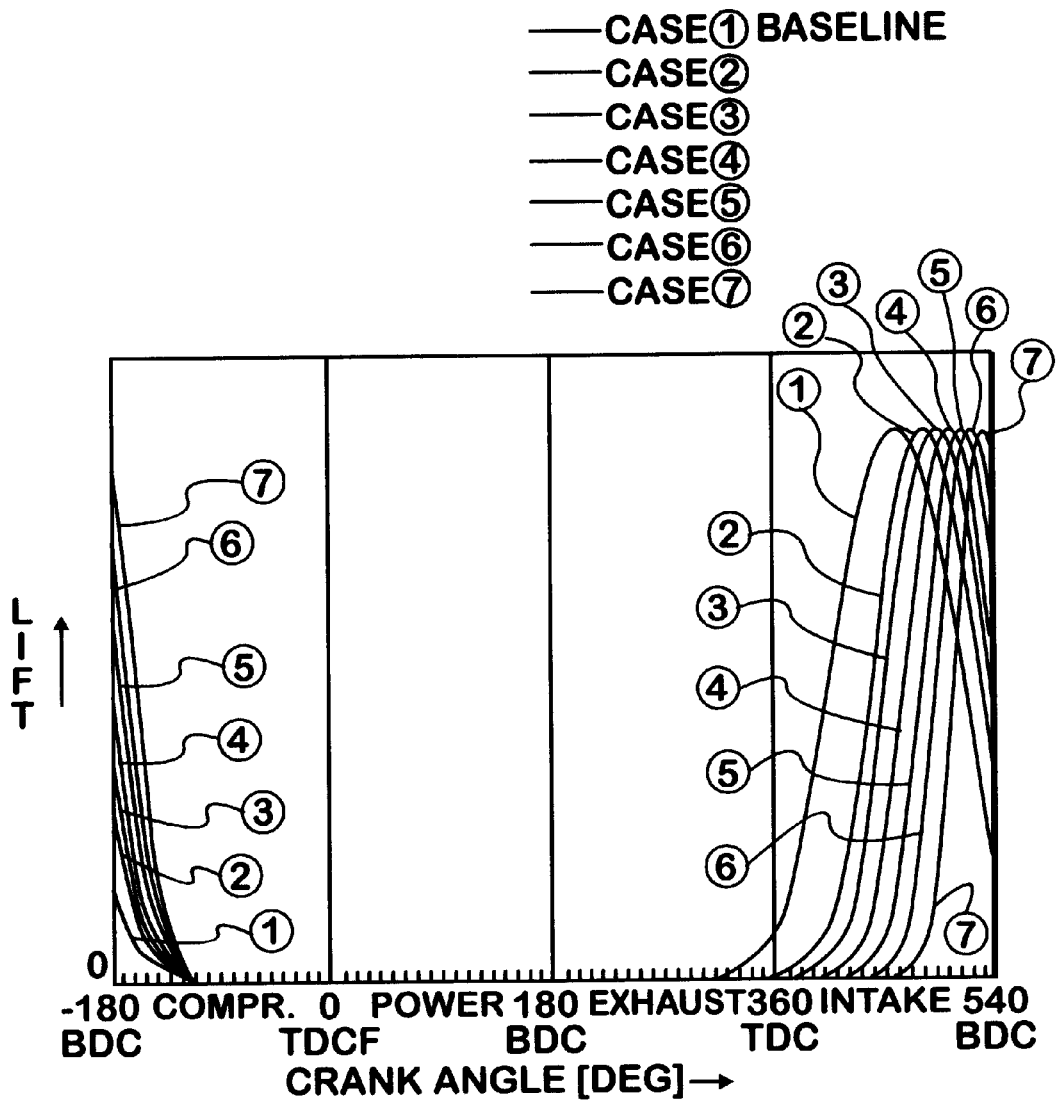

The two-stage intake process for an engine cylinder involves first opening the exhaust valve and then the intake valve during an intake stroke. Overlap between the two valves was kept constant. FIG. 8 is representative of the two-stage intake process. When the exhaust valve opens during the intake stroke, some hot exhaust gas is drawn back into cylinder in order to help warm up the engine. One purpose of the simulation was to investigate effects of the timing of exhaust valve open duration on engine cylinder temperature and average heat transfer to the cylinder wall. This simulation simulated the very beginning of cold start without any injection of fuel into the cylinder. The second exhaust valve lift (reopening lift) was kept constant and re-opening timing was fixed around TDC. Intake valve closing timing was the same as a baseline engine having fixed valve timing provided by a camshaft rather than variable valve timing. The timing of exhaust valve closing after reopening was swept in increments of 20 degrees as seen in FIG. 9. FIG. 10 shows that intake valve opening timing was correspondingly changed with exhaust valve closing timing to keep valve overlap constant.

Figure 11:
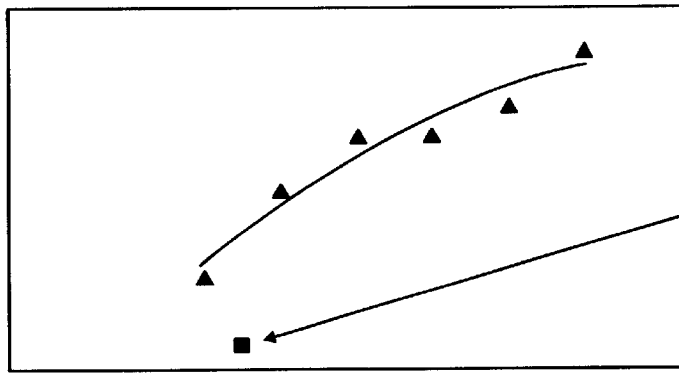
FIGS. 11–16 are graph plots of various data resulting from the simulation using the timing plots of FIGS. 8–10.
Figure 12:
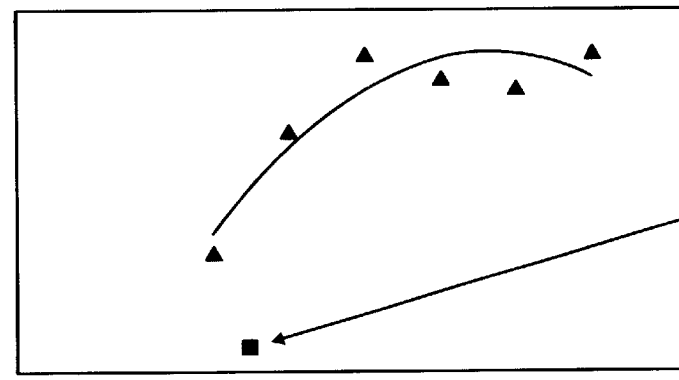
Figure 13:
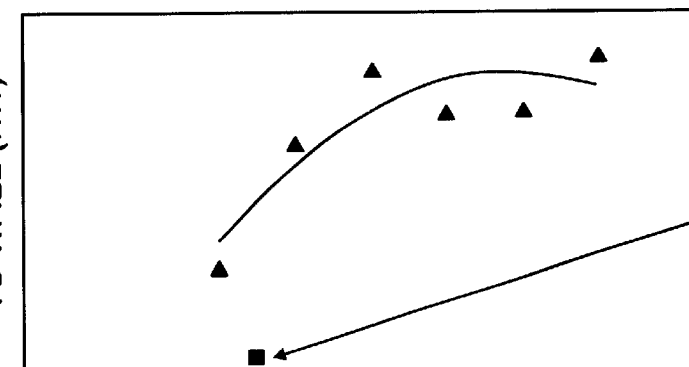

FIGS. 11–16 demonstrate how the timing of exhaust valve closing after re-opening affects cylinder temperature, average heat transfer to cylinder wall, trapped air mass in cylinder, and motoring torque. FIGS. 11 and 12 show that cylinder temperature was increased. FIG. 13 shows that the average heat transfer to the cylinder wall was also increased.

Figure 14:
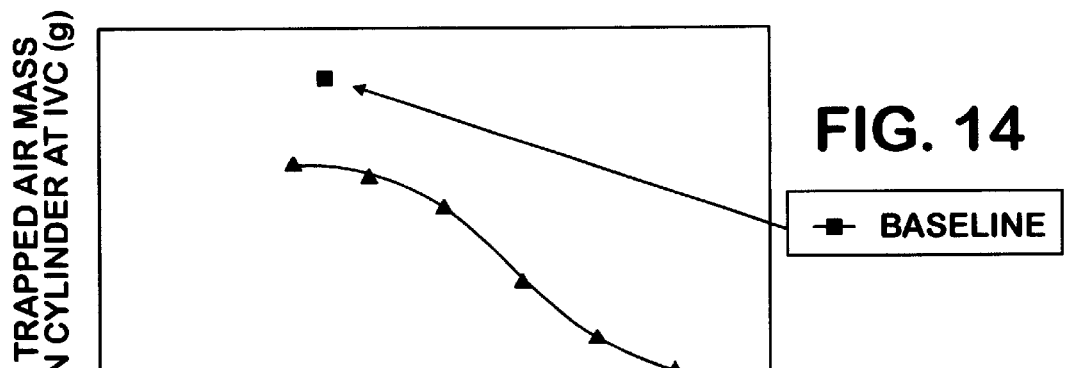
Figure 15:
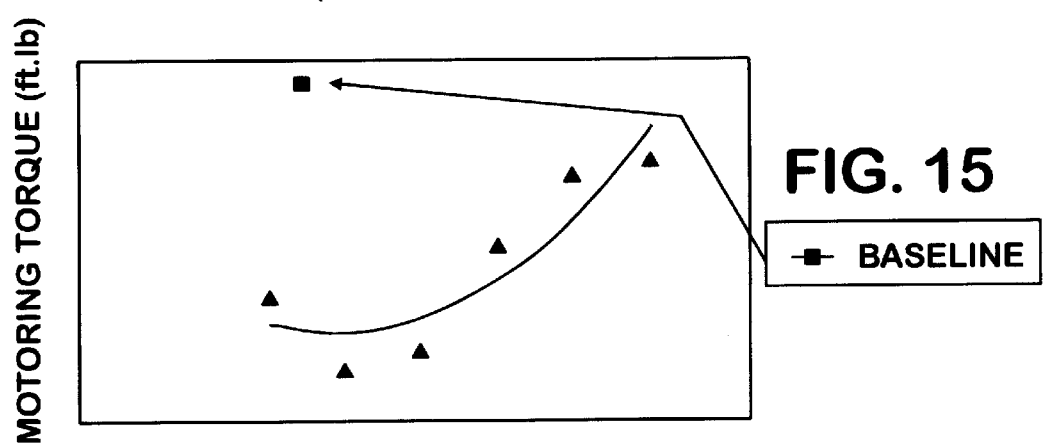
Figure 16:
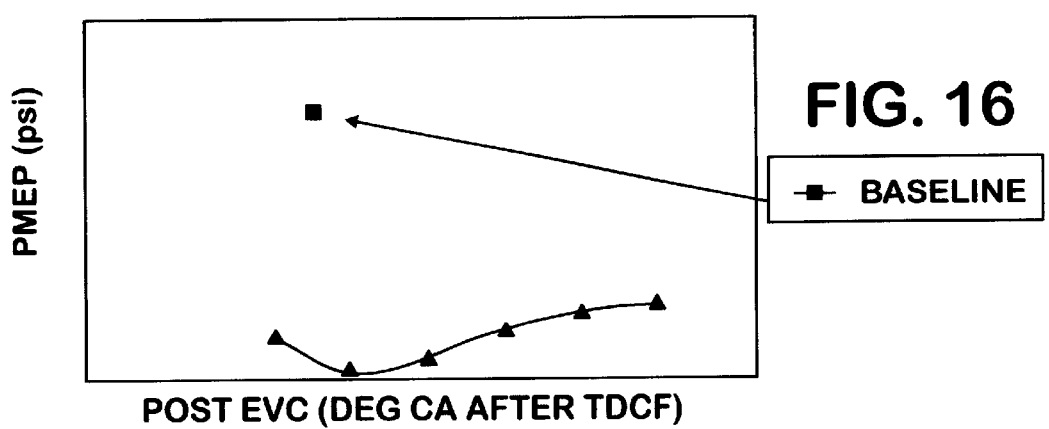

Vaporization of injected fuel under cold temperature conditions at engine starting, and faster engine warm up can be expected because of the additional heat transfer to coolant through the cylinder wall. As shown in FIG. 14 however, trapped air mass in the cylinder was reduced, and therefore it was believed desirable to apply the two-stage intake strategy to less than all the cylinders. FIG. 15 showed that motoring torque was slightly increased due to increased pump loss as seen in FIG. 16.

Strategy 2): Two-stage Intake Process in Combination with Advancing the Timing of Exhaust Valve Opening As seen above, the two-stage intake process can improve engine cold starting. Further improvement was discovered by combining the two-stage intake process with advancing the timing of exhaust valve opening. FIGS. 19–24 show simulation results of using this combined strategy.

Figure 17:
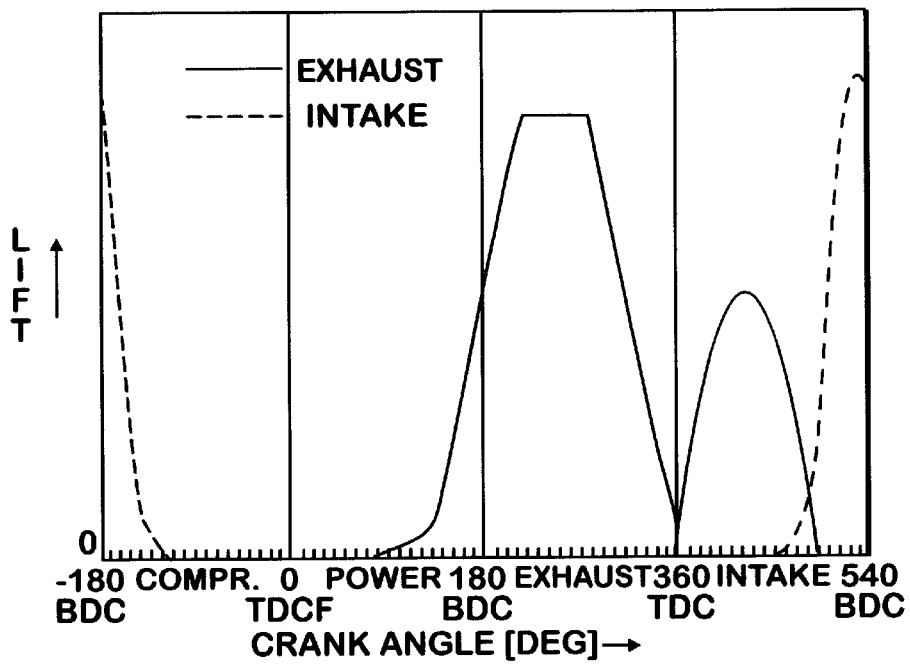
FIGS. 17 and 18 are timing plots of valve operation in a simulation involving additional principles of the invention.
Figure 18:
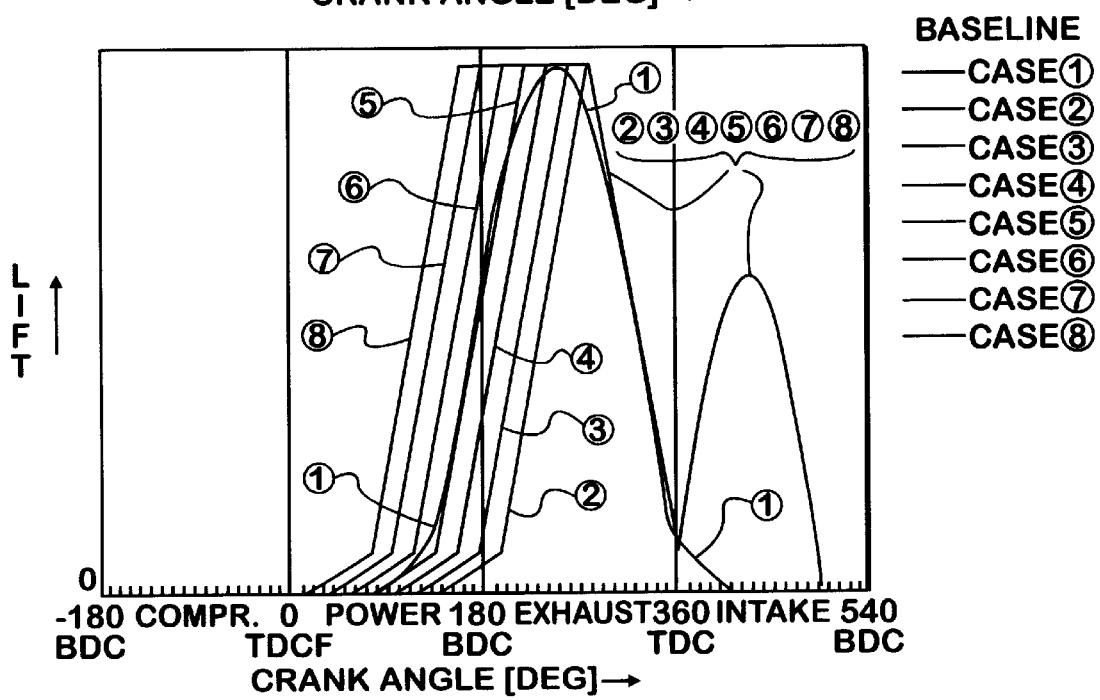
Figure 19:
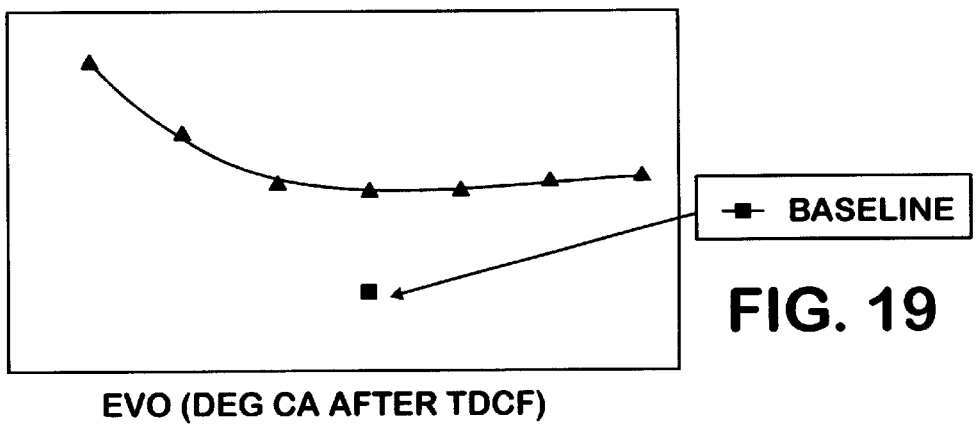
FIGS. 19–24 are graph plots of various data resulting from the simulation using the timing plots of FIGS. 17 and 18.
Figure 20:
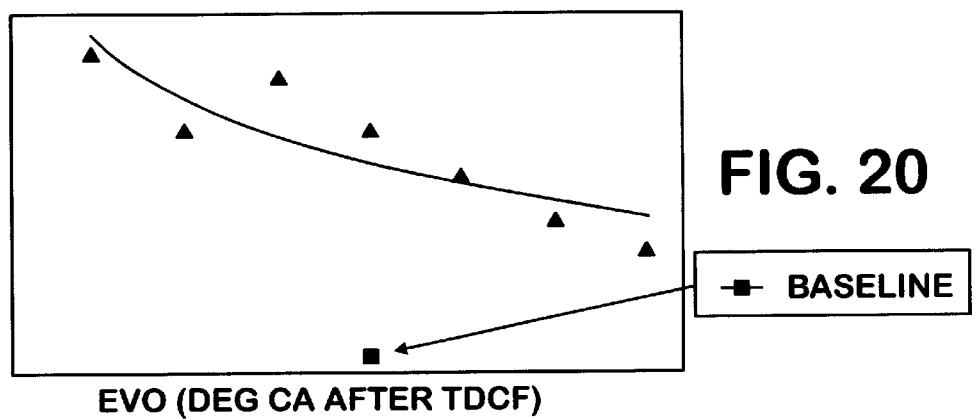
Figure 21:
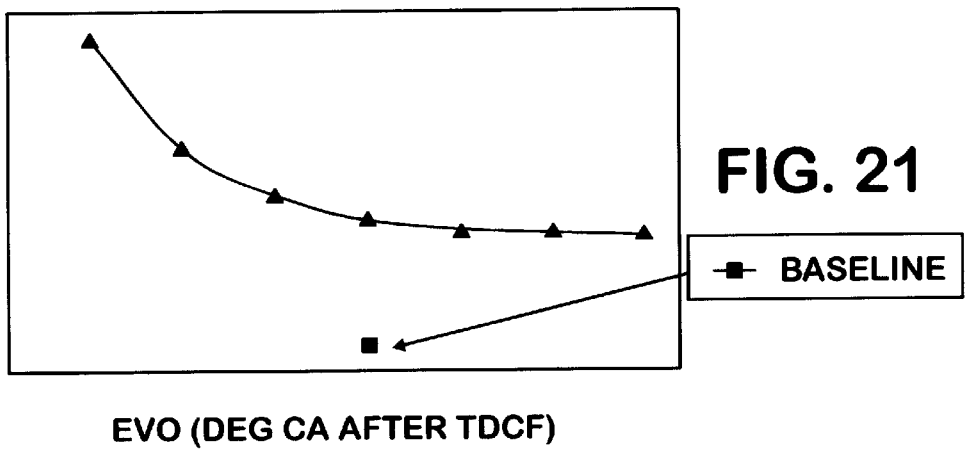
Figure 22:
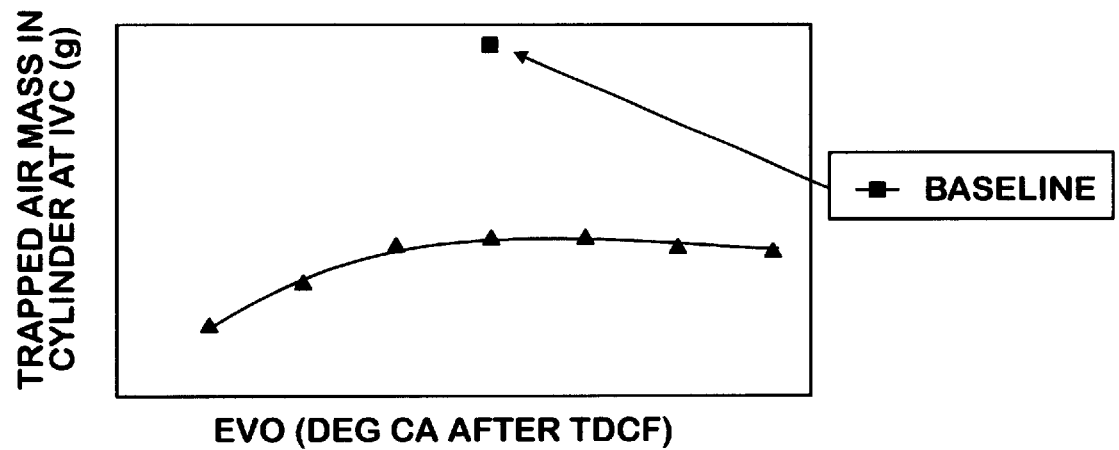
Figure 23:
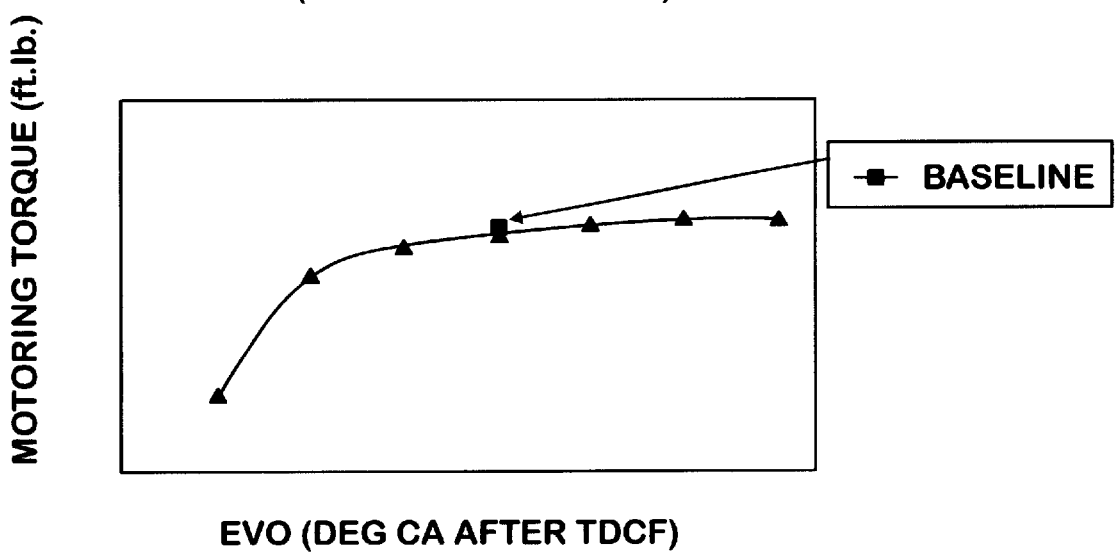
Figure 24:
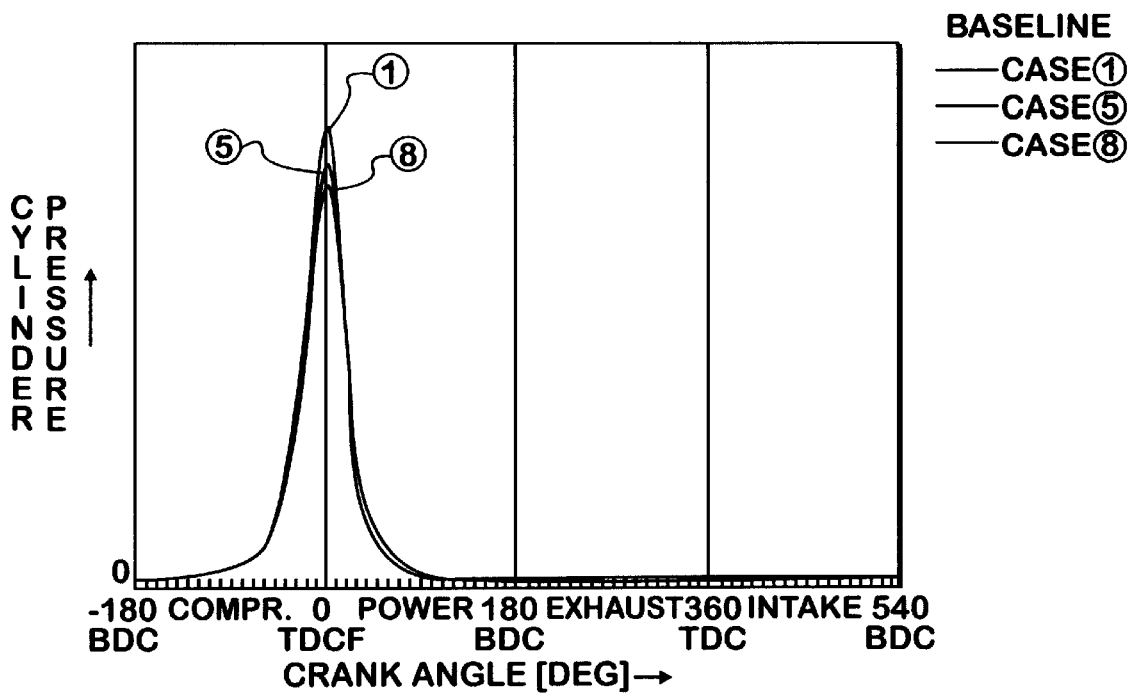

FIG. 17 shows that this simulation was conducted by keeping the second exhaust valve opening profile and timing, and the intake valve profile and timing, both constant during engine running. Values for those constants which were chosen from the prior two-stage intake simulation study at the maximum cylinder temperature were obtained. The main exhaust valve opening timing was swept only in increments of 20 degrees as shown in FIG. 18. The main exhaust valve profile was modified to ensure only the main EVO timing changed.

When fresh air was compressed to TDC, the maximum cylinder temperature is achieved. If the exhaust valve opens early during the expansion stroke, gas exhausted into the exhaust manifold will be hotter. When the exhaust valve opens again during an early portion of the intake stroke, the exhausted gas will be drawn back into the cylinder.

Utilizing strategy 2) significantly increased cylinder temperature at IVC. The average heat transfer to cylinder wall was also increased dramatically when the exhaust valve opened early toward TDCF. This strategy can greatly enhance engine cold starting in cold ambient conditions, but the enhancement is limited by the fact that trapped air mass in the cylinder is reduced and motoring torque is increased because of reduced expansion work.

Figure 25:
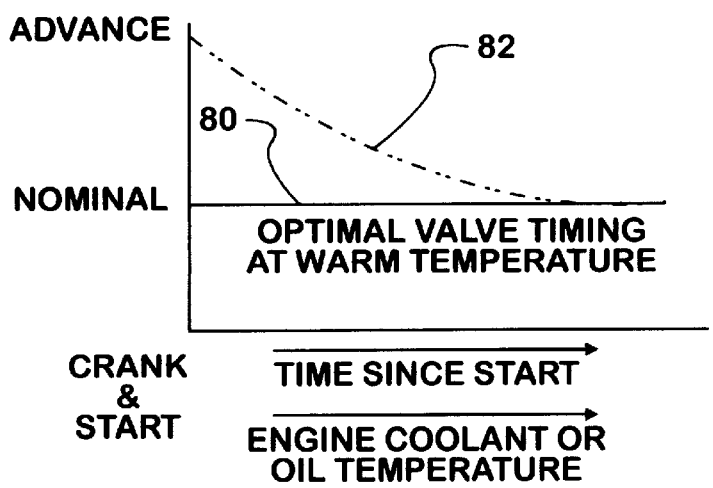
FIG. 25 is graph plot of advance of exhaust valve timing versus engine cranking, starting and warm-up time.

FIG. 25 graphically shows an example of how the advance of timing of exhaust valve opening may change as an engine warms up. Reference numeral 80 represents an optimal timing for exhaust valve opening once the engine has fully warmed up. When the cold engine is cranked and started, the timing of exhaust valve opening is advanced from the timing represented by numeral 80. As the engine commences running and is warming up, the amount of advance is reduced, such as in accordance with the trace 82, until the engine has fully warmed up and operates with timing represented by numeral 80. During warm-up, appropriate adjustments may be made to the second stage of the two-stage process and/or to the intake valve opening, as described earlier. Once the engine has fully warmed up to operating temperature, the second stage of the two-stage process is discontinued so that the process reverts to the single-stage one.

The invention possesses a number of significant advantages. It can be implemented in an existing engine control as part of an overall engine control strategy, provided that the engine has variable valve actuation capability for cylinder exhaust and intake valves. It has the potential for eliminating the need to use starting aid accessories, like those mentioned earlier. By reducing the cranking torque required at starting of the cranking motor, it is possible that a less powerful, and hence smaller and less costly, starter motor may be used. And the invention offers the possibility for favorable improvements in engine performance, including improvement in tailpipe emissions, especially at engine starting where such emissions often tend to be most difficult to manage.

While a presently preferred embodiment of the invention has been illustrated and described, it should be appreciated that principles of the invention are applicable to all embodiments and uses that fall within the scope of the following claims.

What is claimed is:

1. A method of cranking and starting a multi-cylinder internal combustion engine at an engine temperature that is substantially below a range of engine operating temperatures within which engine operation will eventually stabilize after the engine has been running for an amount of time sufficient to bring its temperature within that temperature range, the engine having a kinematic mechanism, including pistons that reciprocate within the cylinders, through which energy of combustion occurring within the cylinders is converted to a torque output, and a variable valve actuation mechanism for varying the opening and closing times of intake and exhaust valves that control flow between the cylinders and the respective intake and exhaust systems, the method comprising:

a) cranking the engine while not fueling the cylinders and while operating the variable valve actuation mechanism to cause the pistons in at least some of the cylinders to operate at an initial effective compression ratio for initial cranking that is less than an effective compression ratio for running when the engine is eventually fueled and runs under its own power;

b) then, while continuing not fueling the cylinders, operating the variable valve actuation mechanism to cause the pistons in those cylinders that are operating at the initial effective compression ratio to draw charge air through a respective intake valve and compress the drawn charges to an increased effective compression ratio that is greater than the initial effective compression ratio and to exhaust the compressed charges through a respective exhaust valve into the exhaust system;

c) then operating the variable valve actuation mechanism to cause the pistons in those cylinders to continue operating at the increased effective compression ratio while commencing to draw a portion of their charges from the exhaust system through the respective exhaust valve; and d) then commencing the fueling of less than all of the cylinders while operating the variable valve actuation mechanism to operate the intake and exhaust valves of the cylinders being fueled to cause the engine to start running under its own power.

2. A method as set forth in claim 1 comprising operating the variable valve actuation mechanism during step c) to cause the pistons in those cylinders that continue operating at the increased effective compression ratio to commence drawing a portion of each of their charges from the exhaust system through the respective exhaust valve during alternate downstrokes of the respective piston.

3. A method as set forth in claim 2 comprising when the steps of the method have progressed to step c), operating the variable valve actuation mechanism to also cause the exhaust valves of those cylinders whose pistons are operating at the increased effective compression ratio to be closed during an earlier portion of each upstroke that immediately precedes a selected one of the alternate downstrokes and to be open during a later portion of that upstroke.

4. A method as set forth in claim 3 including the further steps of:
   e) commencing the fueling of the cylinders not already being fueled; and
   f) operating the variable valve actuation mechanism to operate the intake and exhaust valves of the latter cylinders to cause the pistons in the latter cylinders to begin powering the engine sequentially so that each succeeding one commences powering the engine only after a preceding one that has begun to power the engine has executed at least one engine cycle.

5. A method as set forth in claim 4 including the further step of:
   g) operating the variable valve actuation mechanism to vary the opening time of the exhaust valves as a function of engine operating temperature after all pistons have commenced powering the engine.

6. A method as set forth in claim 5 wherein step g) comprises operating the variable valve actuation mechanism to decrease the amount of advance in the opening time of the exhaust valves as engine operating temperature increases.

7. A method as set forth in claim 4 wherein the engine comprises an even number of cylinders, and step a) comprises operating the variable valve actuation mechanism to cause the pistons in one half of the cylinders to operate at the initial effective compression ratio for initial cranking.

8. A method as set forth in claim 1 including the further steps of:
   e) commencing the fueling of the cylinders not already being fueled; and
   f) operating the variable valve actuation mechanism to operate the intake and exhaust valves of the latter cylinders to cause the pistons in the latter cylinders to begin powering the engine sequentially so that each succeeding one commences powering the engine only after a preceding one that has begun to power the engine has executed at least one engine cycle.

9. A method as set forth in claim 8 including the further step of:
   g) operating the variable valve actuation mechanism to decrease the amount of advance in the opening time of the exhaust valves as engine operating temperature increases.

10. A method of cranking a multi-cylinder internal combustion engine prior to fueling any cylinder, the engine having a kinematic mechanism, including pistons that reciprocate within the cylinders, through which energy of combustion occurring within the cylinders is converted to a torque output, and a variable valve actuation mechanism for varying the opening and closing times of intake and exhaust valves that control flow between the cylinders and the respective intake and exhaust systems,
    the method comprising:
    a) cranking the engine while operating the variable valve actuation mechanism to cause the pistons in at least some of the cylinders to operate at an initial effective compression ratio for initial cranking that is less than an effective compression ratio for running when the engine is eventually fueled and runs under its own power;
    b) then operating the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system; and
    c) then operating the variable valve actuation mechanism to cause the pistons in those cylinders to continue operating at the increased effective compression ratio while commencing to draw a portion of their charges from the exhaust system through the respective exhaust valve.

11. A method as set forth in claim 10 comprising operating the variable valve actuation mechanism during step c) to cause the pistons in those cylinders that continue operating at the increased effective compression ratio to commence drawing a portion of each of their charges from the exhaust system through the respective exhaust valve during alternate downstrokes of the respective piston.

12. A method as set forth in claim 11 comprising when the steps of the method have progressed to step c), operating the variable valve actuation mechanism to also cause the exhaust valves of those cylinders whose pistons are operating at the increased effective compression ratio to be closed during an earlier portion of each upstroke that immediately precedes a selected one of the alternate downstrokes and to be open during a later portion of that upstroke.

13. A method of cranking and starting a multi-cylinder internal combustion engine at a starting engine temperature and then running the engine to a running engine temperature that is substantially greater than the starting engine temperature, the engine having a kinematic mechanism, including pistons that reciprocate within the cylinders, through which energy of combustion occurring within the cylinders is converted to a torque output, and a variable valve actuation mechanism for varying the opening and closing times of intake and exhaust valves that control flow between the cylinders and the respective intake and exhaust systems,
    the method comprising:
    a) cranking the engine while the cylinders are not being fueled and while operating the variable valve actuation mechanism to cause the pistons in at least some of the cylinders to operate at an initial effective compression ratio for initial cranking that is less than an effective compression ratio for running when the engine is eventually fueled and runs under its own power;
    b) then, while the cylinders continue not to be fueled, operating the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system;
    c) then operating the variable valve actuation mechanism to cause the pistons in those cylinders to continue operating at the increased effective compression ratio while commencing to draw a portion of their charges from the exhaust system through the respective exhaust valve;
    d) then commencing the fueling of at least some of the cylinders and operating the variable valve actuation mechanism to operate the intake and exhaust valves of the cylinders being fueled to start the engine running under its own power; and
    e) then operating the variable valve actuation mechanism to advance the timing of opening of the exhaust valves from what that timing will become once the engine has attained running temperature and to change that timing as a function of engine temperature as the engine temperature approaches running temperature.

14. A method set forth in claim 13 wherein step e) further comprises operating the variable valve actuation mechanism to decrease the amount of advance in the opening time of the exhaust valves and in the closing time of the intake valves as engine operating temperature increases from starting temperature to running temperature.

15. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders, including intake valves for controlling communication of the cylinders with the intake system;

an exhaust system through which products of combustion are exhausted from the cylinders, including exhaust valves for controlling communication of the cylinders with the exhaust system;

a variable valve actuation mechanism for varying the opening and closing times of the intake and exhaust valves;

a control for controlling engine operation, including controlling the variable valve actuation mechanism, the control comprising an operating program for cranking and starting the engine at an engine temperature substantially below a range of engine running temperatures within which engine operation will eventually stabilize after the engine has been running for an amount of time sufficient to bring its operating temperature within the running temperature range, and that:

a) while the engine is being cranked, causes the cylinders not to be fueled and operates the variable valve actuation mechanism to cause the pistons in at least some of the cylinders to operate at an initial effective compression ratio for initial cranking that is less than an effective compression ratio for running when the engine is eventually fueled and runs under its own power;

b) then, while continuing to cause the cylinders not to be fueled, operates the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system;

c) then operates the variable valve actuation mechanism to cause the pistons in those cylinders to continue operating at the increased effective compression ratio while commencing to draw some charge air from the exhaust system through the respective exhaust valve; and d) then commences the fueling of less than all of the cylinders and operates the variable valve actuation mechanism to operate the intake and exhaust valves of the cylinders being fueled to start the engine running under its own power.

16. An internal combustion engine as set forth in claim 15 wherein the operating program operates the variable valve actuation mechanism to cause the pistons in those cylinders that continue operating at the increased effective compression ratio to commence drawing a portion of each of their charges from the exhaust system through the respective exhaust valve during alternate downstrokes of the respective piston.

17. An internal combustion engine as set forth in claim 16 wherein when operation c) is occurring, the control operates the variable valve actuation mechanism to also cause the exhaust valves of those cylinders whose pistons are operating at the increased effective compression ratio to be closed during an earlier portion of each upstroke that immediately precedes a selected one of the alternate downstrokes and to be open during a later portion of that upstroke.

18. An internal combustion engine as set forth in claim 17 wherein the operating program operates further to:

e) commence the fueling of the cylinders not already being fueled; and f) operate the variable valve actuation mechanism to operate the intake and exhaust valves of the latter cylinders to cause the pistons in the latter cylinders to begin powering the engine sequentially so that a succeeding one does not commence powering the engine until after a preceding one that has begun to power the engine has executed at least one engine cycle.

19. An internal combustion engine as set forth in claim 18 wherein the operating program:

g) operates the variable valve actuation mechanism to vary the opening time of the exhaust valves as a function of engine operating temperature after all pistons have commenced powering the engine.

20. An internal combustion engine as set forth in claim 19 wherein the operating program operates the variable valve actuation mechanism to decrease the amount of advance in the opening time of the exhaust valves as engine operating temperature increases.

21. An internal combustion engine as set forth in claim 18 wherein the engine comprises an even number of cylinders, and the operating program operates the variable valve actuation mechanism to cause the pistons in one half of the cylinders to operate at the initial effective compression ratio for initial cranking.

22. An internal combustion engine as set forth in claim 15 wherein the operating program operates to:

e) commence the fueling of the cylinders not already being fueled; and f) operate the variable valve actuation mechanism to operate the intake and exhaust valves of the latter cylinders to cause the pistons in the latter cylinders to begin powering the engine sequentially so that a succeeding one commences powering the engine only after a preceding one that has begun to power the engine has executed at least one engine cycle.

23. An internal combustion engine as set forth in claim 22 wherein the operating program operates the variable valve actuation mechanism to decrease the amount of advance in the opening time of the exhaust valves as engine operating temperature increases.

24. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders, including intake valves for controlling communication of the cylinders with the intake system;

an exhaust system through which products of combustion are exhausted from the cylinders, including exhaust valves for controlling communication of the cylinders with the exhaust system;

a variable valve actuation mechanism for varying the opening and closing times of the intake and exhaust valves;

a control for controlling engine operation, including controlling fueling of the engine and operation of the variable valve actuation mechanism, the control comprising an operating program for cranking the engine while disallowing fueling of the engine, and that:

a) cranks the engine while operating the variable valve actuation mechanism to cause the pistons in at least some of the cylinders to operate at an initial effective compression ratio for initial cranking that is less than an effective compression ratio for running when the engine is eventually fueled and runs under its own power;

b) then operates the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system; and c) then operates the variable valve actuation mechanism to cause the pistons in those cylinders to continue operating at the increased effective compression ratio while commencing to draw some charge air from the exhaust system through the respective exhaust valve.

25. An internal combustion engine as set forth in claim 24 wherein the operating program operates the variable valve actuation mechanism to cause the pistons in those cylinders that continue operating at the increased effective compression ratio to commence drawing a portion of each of their charges from the exhaust system through the respective exhaust valve during alternate downstrokes of the respective piston.

26. An internal combustion engine as set forth in claim 25 wherein when operation c) is occurring, the control operates the variable valve actuation mechanism to also cause the exhaust valves of those cylinders whose pistons are operating at the increased effective compression ratio to be closed during an earlier portion of each upstroke that immediately precedes a selected one of the alternate downstrokes and to be open during a later portion of that upstroke.

27. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders, including intake valves for controlling communication of the cylinders with the intake system;

an exhaust system through which products of combustion are exhausted from the cylinders, including exhaust valves for controlling communication of the cylinders with the exhaust system;

a variable valve actuation mechanism for varying the opening and closing times of the intake and exhaust valves;

a control for controlling engine operation, including controlling cranking and starting of the engine at a starting engine temperature and then running, including fueling, of the engine to a running engine temperature that is substantially greater than the starting engine temperature and controlling operation of the variable valve actuation mechanism, the control comprising an operating program for cranking, starting, and fueling the engine, and that:

a) cranks the engine while operating the variable valve actuation mechanism to cause the pistons in at least some of the cylinders to operate at an initial effective compression ratio for initial cranking that is less than an effective compression ratio for running when the engine is eventually fueled and runs under its own power;

b) then operates the variable valve actuation mechanism to cause the pistons in those cylinders that are operating at the initial effective compression ratio to commence drawing charge air through a respective intake valve and operate at an increased effective compression ratio that is greater than the initial effective compression ratio and exhausting compressed charge air through a respective exhaust valve into the exhaust system; and c) then operates the variable valve actuation mechanism to cause the pistons in those cylinders to continue operating at the increased effective compression ratio while commencing to draw some charge air from the exhaust system through the respective exhaust valve;

d) then fuels at least some of the cylinders and operates the variable valve actuation mechanism to operate the intake and exhaust valves of the cylinders being fueled to start the engine running under its own power; and e) then operates the variable valve actuation mechanism to change the timing of the opening of the exhaust valves as engine operating temperature increases.

28. An internal combustion engine as set forth in claim 27 wherein the operating program e) further operates the variable valve actuation mechanism to decrease the amount of advance in the timing of opening of the exhaust valves and to change the timing of the closing of the intake valves as engine operating temperature increases from starting temperature to running temperature.

29. A method of starting a multi-cylinder internal combustion engine at a starting engine temperature and then running the engine to a running engine temperature that is substantially greater than the starting engine temperature, the engine having a kinematic mechanism, including pistons that reciprocate within the cylinders, through which energy of combustion occurring within the cylinders is converted to a torque output, and a variable valve actuation mechanism for varying the opening and closing times of intake and exhaust valves that control flow between the cylinders and the respective intake and exhaust systems, the method comprising:

a) before fueling the cylinders, operating the variable valve actuation mechanism to cause the pistons in at least some of the cylinders to commence drawing charge air through a respective intake valve, compress the charge air, and exhaust the compressed charge air through a respective exhaust valve into the exhaust system;

b) then operating the variable valve actuation mechanism to cause the pistons in those cylinders to commence drawing a portion of their charges from the exhaust system through the respective exhaust valve;

c) then commencing the fueling of those cylinders and operating the variable valve actuation mechanism to operate the intake and exhaust valves of those cylinders to start the engine running under its own power; and d) then operating the variable valve actuation mechanism to decrease the amount of advance in the opening time of the exhaust valves of those cylinders as engine operating temperature increases.

30. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders, including intake valves for controlling communication of the cylinders with the intake system;

an exhaust system through which products of combustion are exhausted from the cylinders, including exhaust valves for controlling communication of the cylinders with the exhaust system;

a variable valve actuation mechanism for varying the opening and closing times of the intake and exhaust valves;

a control for controlling engine operation, including controlling starting of the engine at a starting engine temperature and then running, including fueling, of the engine to a running engine temperature that is substantially greater than the starting engine temperature and controlling operation of the variable valve actuation mechanism, the control comprising an operating program for starting and fueling the engine, and that:

a) operates the variable valve actuation mechanism to cause the pistons in at least some of the cylinders to commence drawing charge air through a respective intake valve, compress the charge air, and exhaust the compressed charge air through a respective exhaust valve into the exhaust system;

b) then operates the variable valve actuation mechanism to cause the pistons in those cylinders to commence drawing some charge air from the exhaust system through the respective exhaust valve;

c) then fuels those cylinders and operates the variable valve actuation mechanism to operate the intake and exhaust valves of those cylinders being fueled to start the engine running under its own power; and d) then operates the variable valve actuation mechanism to decrease the amount of advance in the opening time of the exhaust valves of those cylinders as engine operating temperature increases.

* * * * *